June 10, 1930. J. B. ANDERSON ET AL 1,763,289

BURNER

Original Filed March 29, 1928

INVENTORS.

Patented June 10, 1930

1,763,289

UNITED STATES PATENT OFFICE

JAMES B. ANDERSON AND HARRY J. ANDERSON, OF SHALER TOWNSHIP, ALLEGHENY COUNTY, PENNSYLVANIA

BURNER

Refiled for abandoned application Serial No. 265,565, filed March 29, 1928. This application filed July 30, 1929. Serial No. 382,152. Renewed November 23, 1929.

This application is a refiling of application Serial No. 265,565, filed March 29, 1928, and which was abandoned.

Our improved burner is intended for use with gaseous fuel as with a blow torch or soldering iron, and more particularly with a hydrocarbon liquid gas.

Such devices are employed in many arts, such for instance in welding, soldering, brazing, and the like, and in paint or enamel removal, and in general for the application of heat for any purpose.

In many of these uses a slender or pencil-like flame is required for the application of the heat to a restricted or limited surface or space as for instance when a fine or delicate weld is to be made, or the point of a soldering iron is to be heated, or where the paint or other coating is to be removed from a narrow cranny, corner, angle or recess, or where the heat application is to be confined to narrow limits to prevent injury to adjacent parts or surfaces.

The flames produced by the types of such burners now in general use are not such as are adapted for these and like purposes, and therefore the object which we have in view is the provision of a new type of burner which will produce slender or pencil-like flames of the requisite intensities and which will provide for the adjustment of the flame to the particular requirement of the uses to which it is to be put.

In the production of flames of this general character, owing to the velocity of the gas, there is a tendency of the flame blowing out, and we provide novel and efficient means for maintaining ignition while the flame is being produced.

Our novel burner is particularly adapted for use with hydrocarbon liquid gas as a fuel.

Other novel features or construction, and also of arrangement of parts, will appear from the following description.

Figure 1:
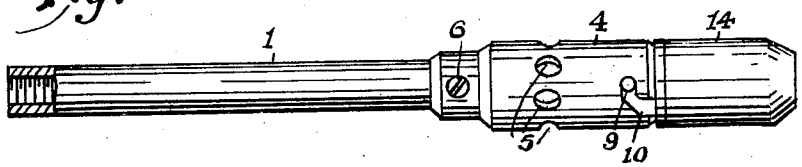
Figure 2:
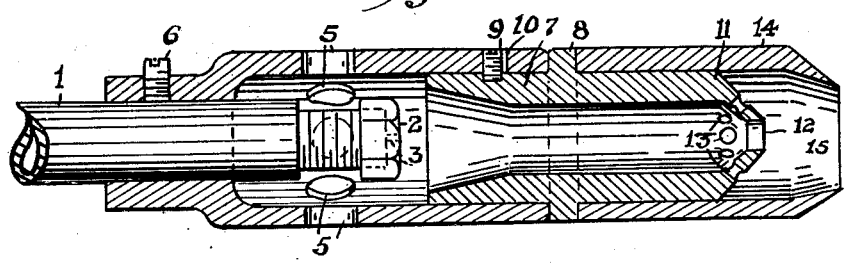
Figure 3:
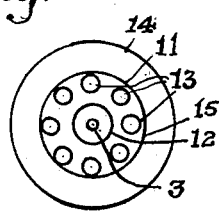
Figure 4:
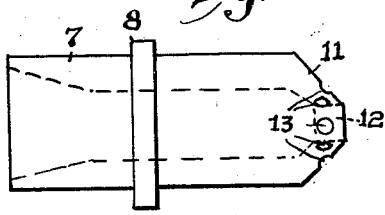
Figure 4:
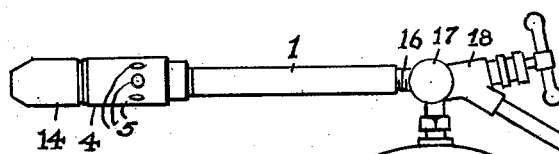

In the accompanying drawings, wherein we have illustrated the best embodiment of the principles of our invention now known to us, Fig. 1 is a side elevation of the burner; Fig. 2 an enlarged longitudinal section of the same; Fig. 3 a front end view of the burner; Fig. 4 a side elevation of the nozzle thimble; and Fig. 5 an elevation showing the burner applied to a blow torch.

Referring to the drawings, 1 represents the gas supply tube which is connected to a source of fuel supply, such as the tank of a blow torch.

The outer or discharge end of said tube is provided with a jet opening. Thus we have shown the end of the tube closed by a screw cap 2 having an axial jet opening 3 indicated by dotted lines in Fig. 2.

4 reprseents a cylindrical mixer sleeve of differential diameter, the smaller rear end having a sliding fit on the tube 1 while the larger front end surrounds the perforated cap 2.

The wall of the larger portion of the tube is provided with an annularly arranged series of air-ports 5.

The proportionate quantity of air drawn in through said ports may be adjusted by sliding the sleeve longitudinally of the tube 1 and fixing it in its adjusted position, as by means of the set screw 6.

7 represents a nozzle thimble which is attached to the outer end of the mixer sleeve 4.

Thus the rear end of the thimble may be inserted into the end of the mixer sleeve, the degree of insertion being limited by the circumferential shoulder 8 on the thimble.

The thimble may be held in place on the sleeve by any convenient means, as by means of its stud 9 engaging a bayonet slot 10 in the sleeve 4, as illustrated in Fig. 1.

The inner end of the bore of the thimble is flared, as shown in Fig. 2, to reduce the resistance to the travel of the flaming gas.

At its outer end the wall of the thimble is contracted as at 11 to produce a tapered nozzle opening 12, and the converging wall of said opening is provided with a plurality of relatively small ports 13 in annular series surrounding the nozzle opening.

These ports are arranged to diverge outwardly as shown.

14 represents the tubular flame-shield which has a drive fit on the outer end of the nozzle thimble.

The wall of the tube 14 is contracted at its outer end to provide a reduced orifice 15.

Figure 5:
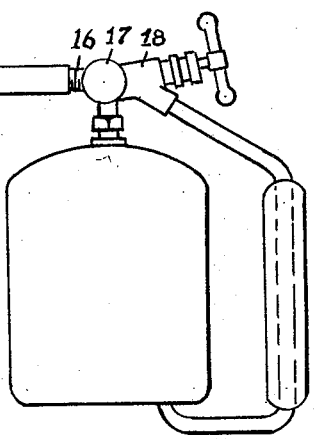

The burner may be mounted on a portable blow torch, as illustrated in Fig. 5 wherein we have shown the blow torch which forms the subject matter of a certain patent application filed in the United States Patent Office on September 24, 1927, being Serial No. 221,654.

The rear end of the tube 1 is shown screwed onto the threaded neck 16 of the swivel burner support 17, the gas supply being controlled by the control valve 18.

In operation, the gas issues at relatively high velocity from the jet opening 3 and is mixed with air in the mixed sleeve 4, the proportion of air being regulated by adjusting the sleeve along the tube 1.

The central column of burning gas is impelled forwardly through the nozzle opening 12 and out through the orifice 15 of the flame shield. Smaller jets of burning gas pass out through the small ports 13 around the main column, said jets being directed by the divergence of the ports against the wall of the flame shield 14 which with the contracted outer end of the bore of the flame shield causes a reverberation of the flames from said jets.

The provision of the small jets and the reverberation of their flames insures the maintenance of the combustion of the gas in the main column, so that the tendency of blowing out is overcome and a very slender column of flame may be maintained.

This is one of the very marked advantages of our improved burner and in practice the gases in the central column are in full combustion for the entire length or extent of the same instead of only at or near its outer end as is true with other types of burners for the same general purposes.

When hydrocarbon liquid gas is used, the same before liquefaction is at a temperature of about forty-four degrees below zero, Fahr., and gasifies at about eighteen degrees above zero, Fahr.

This liquefaction readily occurs or is completed in the tube 1 because of the conduction of the heat from the flame-shield and nozzle thimble through the mixer sleeve to the tube.

Our improved burner has been employed with marked advantage in delicate and difficult soldering operations, such as the wires on electrical switch boards and in metal pattern making.

In paint removal work it has been found particularly useful as crannies, corners, angles and other contracted portions are easily and effectively reached and treated by the flame, thus rendering unnecessary the use of sand-paper, emery-paper or files which are required in the present practice.

In the use of our improved burner we require no regulator to regulate the pressures but may connect the burner, as shown, direct to a blow torch tank employing only the usual valve to control the passage of gas to the burner.

What we desire to claim is:

1. A burner structure of the character described and comprising an inlet passage for the gas, said passage having a jet opening at its discharge end, an air-mixing chamber surrounding said jet opening, a passage for the fuel mixture extending from the chamber and having a nozzle orifice at its outer end for the discharge of a column of burning gases, a plurality of small ports surrounding said nozzle orifice and leading from said second named passage to produce jet flames surrounding said column, said ports diverging outwardly, and a tubular flame shield extending forwardly from said nozzle orifice and acting to reverberate the jet flames into contact with said column, said flame shield having a restricted discharge opening.

2. In a burner of the character described, the combination of a gas-supply tube having a jet opening at its discharge end, a mixer sleeve mounted on said tube and provided with air-inlet ports in its wall, a nozzle extending forwardly from said sleeve, and tubular flame shield extending forwardly from said nozzle, said nozzle having a central discharge orifice and surrounding said orifice a plurality of small ports leading from the interior of said nozzle to the interior of said flame shield and said flame shield having a restricted discharge orifice.

3. In a burner of the character described, the combination of a gas-supply tube having a jet opening at its discharge end, a mixer sleeve mounted on said tube and provided with air-inlet ports in its wall, a nozzle extending forwardly from said sleeve, and a tubular flame shield extending forwardly from said nozzle, said nozzle having a central discharge orifice and surrounding said orifice a plurality of small ports leading from the interior of said nozzle to the interior of said flame shield, said ports diverging outwardly and said flame shield having a restricted discharge orifice.

4. A burner structure of the character described and comprising an inlet passage for the gas, said passage having a jet opening at its discharge end, an air-mixing chamber surrounding said jet opening, a passage for the fuel mixture extending from the chamber and having a nozzle orifice at its outer end for the discharge of a column of burning gases, a plurality of small ports surrounding said nozzle orifice and leading from said second named passage to produce jet flames surrounding said column, said ports diverging outwardly, and a tubular flame shield extending forwardly from said nozzle orifice and acting to reverberate the jet flames into contact with said column.

5. In a burner of the character described, the combination of a gas-supply tube having a jet opening at its discharge end, a mixer sleeve mounted on said tube and provided with air-inlet ports in its wall, a nozzle extending forwardly from said sleeve, and a tubular flame shield extending forwardly from said nozzle, said nozzle having a central discharge orifice and surrounding said orifice a plurality of small ports leading from the interior of said nozzle to the interior of said flame shield.

6. In a burner of the character described, the combination of a gas-supply tube having a jet opening at its discharge end, a mixer sleeve mounted on said tube and provided with air-inlet ports in its wall, a nozzle extending forwardy from said sleeve, and a tubular flame shield extending forwardly from said nozzle, said nozzle having a central discharge orifice and surrounding said orifice a plurality of small ports leading from the interior of said nozzle to the interior of said flame shield, said ports diverging outwardly.

Signed at Sharpsburg, Pa., this 26 day of July, 1929.

JAMES B. ANDERSON.
HARRY J. ANDERSON.